Patented Apr. 19, 1927.

1,625,475

UNITED STATES PATENT OFFICE.

JOHN A. LAHEY, OF SEWAREN, NEW JERSEY.

FIRE-FLAME-COLORING MEANS.

No Drawing.   Application filed March 12, 1925. Serial No. 15,138.

This invention has reference to an improved composition of matter which is especially useful for coloring fire in domestic fireplaces and the like, where natural logs of wood are burned.

While the composition is particularly efficient when sprinkled upon natural burning logs of wood, it is also useful and effective if spread upon artificial gas logs. In fact, it produces an excellent coloring means when placed in a burning flame from any source.

More specifically speaking, the invention has particular reference to a substance for coloring fire for artistic purposes wherein the substance embodies a non-inflammable absorbent substance in which well known soluble and insoluble salts are embedded to maintain effects of the salts for the longest possible period of time and to utilize the inherent coloring qualities of the same for producing the desired hue in the flames.

The absorbent material employed is preferably asbestos, this being in powdered or other form, or in customary sheet formation with the sheet ground into particles of the proper sizes. In making the new composition, this asbestos, which is preferably well shredded, is soaked in a water solution of any well known soluble salt or salts used to produce color in fire. The salts, if soluble, may well be of copper sulphate or copper chlorid. If desired, which is usually the case, well known insoluble salts may be mixed with the salt solution and the wet asbestos, the whole mass being well stirred. The insoluble salts may be copper or antimony sulfid.

After the several materials named have been well mixed and the asbestos has become thoroughly saturated, the excess liquid is removed from the insoluble mass by draining, under the influence of centrifugal action, or by any other well known means.

The fibres of the asbestos absorbs the salt or salts in the solution and particles of the insoluble salts become thoroughly embedded therein after the asbestos is allowed to dry.

When thoroughly dry and burned, the salts volatilize much more slowly than if the same amount of free salts or salt were used and consequently the color in the flame lasts for a much longer period of time.

If insoluble substances are mixed with the wet asbestos and the whole mass dried, it becomes quite hard. The insoluble substances are literally held or embedded in and between the fibres of the asbestos and when the latter is allowed to dry and is burned, the insoluble substances burn or volatilize more slowly than if the same amount of free insoluble salts were burned, and naturally the color imparted lasts for a greater length of time.

It is thought that the foregoing description will suffice to enable persons skilled in the art to which the invention relates to obtain a clear understanding of the same. For this reason a more lengthy description is deemed unessential.

While the preferred mode and method of compounding the novel composition has been specified, it is to be understood that minor changes coming within the field of invention claimed may be resorted to if desired.

Having thus described the invention, what I claim as new is:—

The method of making a composition to be employed in coloring a fire flame, consisting in mixing soluble salts in a quantity of water to provide a salt solution, immersing asbestos in said solution, adding insoluble salts to the mixture to produce a comparatively thick mass, draining the excess solution from the mass, and allowing the latter to dry so as to incorporate the salts in the fibers or constitutents of the asbestos.

In testimony whereof I affix my signature.

JOHN A. LAHEY.